United States Patent [19]
Helmer-Metzmann et al.

[11] Patent Number: 5,834,566
[45] Date of Patent: Nov. 10, 1998

[54] HOMOGENEOUS POLYMER ALLOYS BASED ON SULFONATED AROMATIC POLYETHERKEYTONES

[75] Inventors: Freddy Helmer-Metzmann; Arnold Schneller, both of Mainz, Germany

[73] Assignee: Hoechst Aktiengesellschaft, Frankfurt am Main, Germany

[21] Appl. No.: 885,514

[22] Filed: Jun. 30, 1997

Related U.S. Application Data

[63] Continuation of Ser. No. 493,577, Jun. 22, 1995, abandoned.

[30] Foreign Application Priority Data

Jun. 24, 1994 [DE] Germany .................. 44 22 158.4

[51] Int. Cl.$^6$ ........................ C08L 65/00; C08L 71/12; C08L 81/06; B01D 71/68
[52] U.S. Cl. ..................... 525/535; 525/471; 525/906
[58] Field of Search ............................ 525/535, 471, 525/906

[56] References Cited

U.S. PATENT DOCUMENTS

| | | | |
|---|---|---|---|
| 5,049,282 | 9/1991 | Linder et al. | 210/651 |
| 5,279,739 | 1/1994 | Pemawansa | 210/500.41 |
| 5,362,836 | 11/1994 | Helmer-Metzmann et al. | 525/535 |

FOREIGN PATENT DOCUMENTS

| | | |
|---|---|---|
| 0008895 | 3/1980 | European Pat. Off. |
| 0041780 | 12/1981 | European Pat. Off. |
| 0568045 | 11/1993 | European Pat. Off. |
| 0575807 | 12/1993 | European Pat. Off. |
| 2216134 | 10/1989 | United Kingdom. |

OTHER PUBLICATIONS

Macromolecules, vol. 16, (1983) by Kambour et al. entitled Phase Behavior of Polystyrene, Poly (2,6–dimethyl–1, 4–phenylene oxide), and Their Brominated Derivatives), pp. 753–757.

Polymer, vol. 24 (1983), by Saeki et al. entitled The Effect of Molecular Weight and Casting Solvent on the Miscibility of Polystyrene–poly( –methyl Styrene) Blends), pp. 60–64.

Olabisi et al., Polymer–Polymer–Miscibility, Academic Press, (1979), pp. 321–327.

Journal of Polymer Science: Polymer Physics Edition, vol. 21, 11–27 1983) by Wang et al. entitled "Morphology and Properties of Poly(vinyl Chloride)–Poly(butadiene–co–Acrylonitrille) Blends", pp. 11–27.

The Organic Chemistry of Sulphur, Wiley, New York, 1962, pp. 29–32.

Polymer Chemistry Edition, vol. 5, (1967), by Johnson et al. entitled "Poly(aryl Ethers) by Nucleophilic Aromatic Substitution. I. Synthesis and Properties", pp. 2375–2398.

Desalination, (1993) Jan., No. 3, Amsterdam, NL entitled Polysulfonate Membranes II. Performance Comparison of Polysulfone–Poly–(N–vinly–Pyrrolidone) Membranes.

Journal of Applied Polymer Science 46 (1992) Sep. 15, No. 2, New York, U.S.

*Primary Examiner*—Frederick Krass
*Attorney, Agent, or Firm*—Frommer Lawrence & Haug LLP

[57] ABSTRACT

Homogeneous polymer alloys comprising, as the main constituents, sulfonated aromatic polyether-ketones and at least one aromatic polysulfone, wherein the materials have a good thermal and mechanical stability and are thereby distinguished in particular as cation exchanger membranes for electrochemical cells with operating temperatures above 100° C.

18 Claims, No Drawings

HOMOGENEOUS POLYMER ALLOYS BASED ON SULFONATED AROMATIC POLYETHERKEYTONES

This application is a continuation of application Ser. No. 08,493,577, filed Jun. 22, 1995 now abandoned.

The invention relates to polymer alloys which comprise, in a homogeneous mixture, at least one sulfonated, aromatic polyether-ketone, at least one aromatic polysulfone and a hydrophilic polymer. The invention furthermore relates to the preparation and use of the polymers.

The principle of modification of properties of polymers as materials by preparation of homogeneous polymer alloys is known. Technologically important properties of polymer materials, which often cannot be realized or can be realized only with difficulty in another manner, such as, for example, by copolymerization, can be improved or adjusted in a controlled way in this manner.

A basic requirement for the possibility of preparation of a homogeneous polymer alloy is the complete miscibility of the alloy components. However, complete miscibility is an unusual property of polymer systems, which usually tend to form multiphase systems (Polymer, Volume 24, page 60 (1983)).

Even modern thermodynamic theories have to date had only limited success regarding prediction of miscibility. It was therefore doubted that any practical theory can be developed which takes into account the actual complexities which nature imparts to polymer-polymer interactions (Macromolecules, Volume 16, page 753 (1983)).

We are therefore to date still a long way from being able to predict the properties of an alloy from the properties of its individual components with certainty, so that alloying of polymers is still largely empirical (Olabisi, Robeson, Shaw: Polymer-Polymer-Miscibility, Academic Press, New York 1979, pages 321–327). In particular, the homogeneous miscibility of polymer alloys which comprise highly interacting polymers cannot be predicted, in spite of a very large number of experimental and theoretical works in this field (Journal of Polymer Science, Polymer Physics Edition, Volume 21, page 11 (1983)).

In industry, however, there is very great interest in homogeneously mixed polymer alloys, since their properties can be adapted to certain requirements in a controlled manner by varying the alloy components and the mixing ratios thereof. Precisely in the field of ion exchanger materials in particular, which are employed as membranes in modern electrochemical cells—for example electrolysis and fuel cells—adjustment of the mechanical properties to the particular field of use is required. It must be taken into account here that in these electrochemical cells it is necessary to use an unsupported film which must remain mechanically stable during operation of the electrochemical unit over several thousand hours. Furthermore, an adequate stability to bases and acids, coupled with an optimum absorption capacity for water without severe swelling and thereby a loss in mechanical properties, is required of the materials. Optimization of the conductivity and an increase in the energy density of the ion exchanger capacity are striven for as target parameters.

The ion exchanger materials employed to date in this field, for example ®NAFION (Du PONT), limit the operating temperatures of membrane electrolysis cells and membrane fuel cells to about 80° C. –100° C. because of their low heat distortion point.

Membranes for ultra- or microfiltration which comprise polymer alloys of sulfonated polyether-ether-ketones and polyether-sulfones are known from GB 2 216 134; however, these membranes have only low chemical resistance in acid and bases. Furthermore, the absorption capacity of these systems for water is unsatisfactory.

The invention was therefore based on the object of providing homogeneous polymer alloys based on sulfonated polyether-ketones, of which the absorption capacity for water and the mechanical properties can be adjusted in a controlled manner by varying the components of the mixture and/or the mixing ratios. Furthermore, the novel systems should be processable to give films which are resistant to chemicals and heat. These ion exchanger films should have higher heat distortion points than the known systems, for example in order to allow operating temperatures of at least 100° C. in membrane electrolysis cells and membrane fuel cells. Furthermore, the ion exchanger equivalent of these systems should be adjustable in a controlled manner.

A homogeneous polymer alloy has now been found which comprises at least one sulfonated, aromatic polyether-ketone and at least one polysulfone, wherein the polysulfone is an aromatic polysulfone, the weight ratio of sulfonated polyether-ketone/polysulfone is 1:99 to 99:1 and the alloy comprises 5 to 30% by weight of at least one hydrophilic polymer chosen from the group consisting of polyvinylpyrrolidone, polyglycol dialkyl ethers, polyglycol dialkyl esters and poly-[1-(2-oxo-1-pyrrol-idinyl)ethylene-co-1-(acetoxy)ethylene]. Aromatic polysulfones are to be understood here as meaning, in particular, polyether-sulfones, i.e. polymers which are built up formally from an aromatic dihydroxy component and an aromatic dihalogen component, the aromatic groups being linked to one another via a sulfone unit in at least one of these structural units. Such products are commercially obtainable or can be prepared by the customary polycondensation processes, as is described, for example, in "The Organic Chemistry of Sulfur", Wiley, New York, 1962, page 29; "Aromatic Nucleophilic Substitution", Elsevier, New York, 1968; R. N. Johnson, A. G. Farnham, R. A. Clendinning, W. F. Hale and C. N. Merriam: J. Polym. Sci., Polym. Chem. Ed., 1967, 5, 2375.

Sulfonated polyether-ketones are already known. They can be prepared by conventional sulfonation processes (for example in accordance with EP-A-008 895 or EP-A-041 780), but are also accessible by a novel process (European Patent Application 0 575 807). They are distinguished by a high heat resistance, an excellent hydrophilicity and a good solubility in organic solvents, such as N-methyl-pyrrolidone or N,N-dimethylformamide.

The sulfonated, aromatic polyether-ketone and the aromatic polysulfone are preferably present in the polymer alloy according to the invention in a weight ratio of 1:9 to 9:1.

If the polymer alloy also comprises poly-N-vinyl-2-pyrrolidone and/or a copolymer of N-vinyl-2-pyrrolidone and vinyl acetate, it is advantageous if the content of sulfonated aromatic polyether-ketones is 60 to 80% by weight and the content of aromatic polysulfones is 10 to 20% by weight.

It is advantageous if the sulfonated aromatic polyether-ketones are built up from recurring units of the formula I

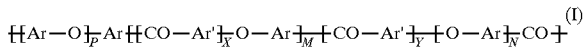

in which
Ar is a phenylene ring with para and/or meta bonds,
Ar' is a phenylene, naphthylene, biphenylene or anthrylene or another divalent aromatic unit, X, M and N independently of one another are zero or 1,
Y is zero, 1, 2 or 3 and
p is 1, 2, 3 or 4, and in which, in the formula I, 20 to 100% of the O-phenylene-O units are substituted by an SO$_3$H group. The indices p, X and M in the formula I are preferably coordinated with one another such that p=2−(1−X)·M.

Sulfonated polyether-ketones of the formula II

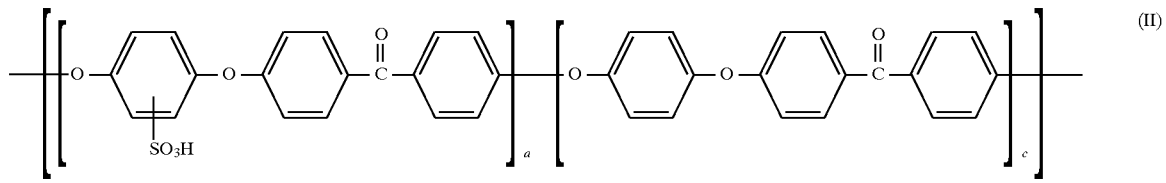

in which a is a number from 0.2 to 1, c is a number from 0 to 0.8 and the sum a+c=1, of the formula III

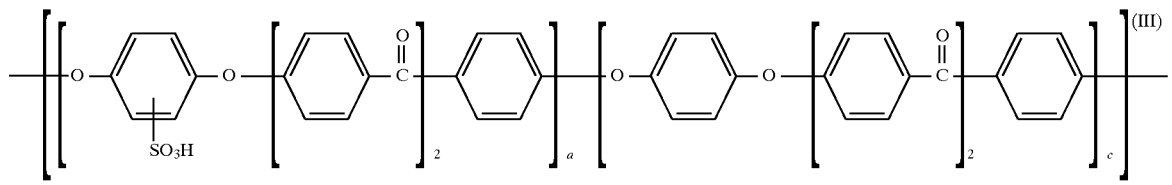

in which a is a number from 0.2 to 1, c is a number from 0 to 0.8 and the sum a+c=1, and of the formula IV

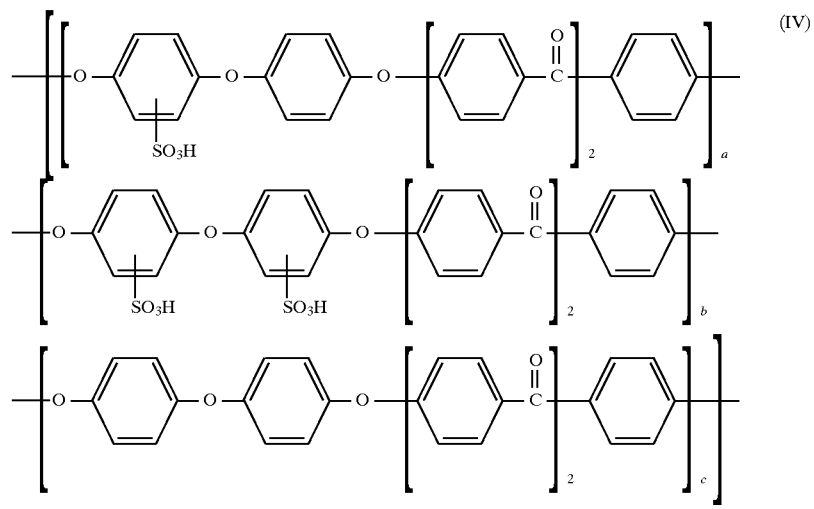

in which a is a number from 0 to 1, b is a number from 0 to 1, c is a number from 0 to 0.5 and the sum a+b+c=1, are preferably employed.

Furthermore, sulfonated polyether-ketones which are composed of at least two different recurring units of the formulae II, III and IV can also be employed. They can be prepared by copolymerization of units of the formula II, III and IV (but free from sulfonic acid groups) and subsequent sulfonation of the copolymer obtained.

The sulfonated polyether-ketones employed preferably have molecular weights, stated as the weight-average, in the range from 10,000 to 150,000 g/mol, in particular in the range from 20,000 to 100,000 g/mol.

Sulfonated polyether-ketones can be prepared by a customary sulfonation process (for example EP-A-008 895,
EP-A-041 780). The sulfonation is preferably carried out by the process described in European Patent Application 0 575 807.

The polymer alloys according to the invention preferably comprise, as aromatic polysulfones, at least one which has structural units of the formula (V)

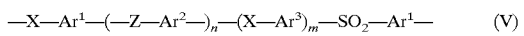

in which

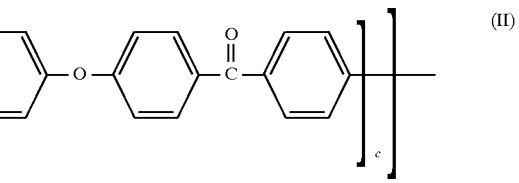

—Ar$^1$— is a 1,4-phenylene radical or a divalent radical of a heteroaromatic or of a C$_{10}$–C$_{14}$-aromatic, which

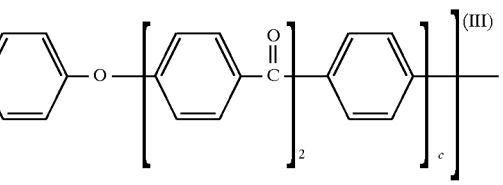

optionally contains sulfonic acid groups or ether bridges and is optionally substituted by one or two branched or unbranched C$_1$–C$_4$-alkyl or alkoxy radicals or by one or more halogen atoms, for example chlorine, fluorine or bromine, —Ar$^2$— and —Ar$^3$— are identical or different 1,2-phenylene, 1,3-phenylene, 1,4-phenylene or 4,4'-biphenyl radicals, which are optionally substituted by one or two branched or unbranched C$_1$–C$_4$-alkyl or alkoxy radicals or by one or more halogen atoms, —Z— is a direct bond or one of the following divalent radicals —O—, —S—, —C(CH$_3$)$_2$—, —C(CF$_3$)$_2$—, —SO$_2$— or —X—Ar$^3$—X—, in which —Ar$^3$— has the above-mentioned meaning, X is O, S, SO, CO or SO$_2$ and n is an integer, in particular n=0, 1 or 2, and m is an integer, in particular m=0, 1 or 2.

Examples of aromatic radicals $Ar^1$ are the 4,4'-biphenyl radical and the anthranylene radical. Examples of heteroaromatics from which $Ar^1$ can be derived are benzoxazole, benzothiazole, benzimidazole and 4-phenyl-imidazole.

Preferred polysulfones are polyether-sulfones and copolyether-sulfones of the formula V, which consist of the structural units A, B, C and/or D (A) —O—Ar—SO$_2$—A—
(B) —O—Ar—O—Ar—SO$_2$—Ar—
(C) —O—Ar—C(CH$_3$)$_2$—Ar—O—Ar—SO$_2$—Ar—,
(D) —O—Ar—Ar—O—Ar—SO$_2$—Ar— in which Ar can have the abovementioned meaning of $Ar^1$, $Ar^2$ and/or of $Ar^3$.

The molecular weights of alloyed polyvinylpyrrolidone (PVP) and copolyvinylpyrrolidone-polyvinyl acetate=poly-[1-(2-oxo-1-pyrrolidinyl)ethylene-co-1-(acetoxy)-ethylene] (abbreviated to: CoPVPAc) are, stated as the weight-average, usually 1000 to 3 million, preferably 20,000 to 200,000, in particular 40,000 to 100,000.

The polyethylene glycol diesters optionally present are derived from aliphatic carboxylic acids having 1–3 carbon atoms or from aromatic carboxylic acids having 7 to 11 carbon atoms. The terminal ether groups of the polyethylene glycol diethers optionally present are alkyl radicals, preferably having 1–8 carbon atoms. In both cases, the molecular weights, stated as the weight-average, are usually 100 to 100,000, preferably 250 to 80,000, in particular from 500 to 50,000. Polyethylene glycol dimethyl ethers and diacetates are particularly preferred.

The homogeneously mixed polymer alloys according to the invention can be prepared from a joint solution which comprises at least one sulfonated aromatic polyether-ketone, at least one polysulfone and at least one of the hydrophilic polymers described above, for example polyvinylpyrrolidone and/or CoPVPAc, in an aprotic organic solvent. For this, for example, the polysulfone can be dissolved in the corresponding solvent, the sulfonated polyether-ketone and the hydrophilic polymer can be dissolved in a suitable concentration, and a mixture of the particular polymer solutions can then be prepared in the calculated ratio of amounts. Aprotic hydrophilic solvents which can be employed are, for example, dimethylformamide, dimethyl sulfoxide, N-methylpyrrolidone or N,N-dimethylacetamide.

Alternatively, sulfonated polyether-ketone and the hydrophilic polymer can be added in dry form directly to the polysulfone solution after the polycondensation has ended.

The polymer alloys according to the invention can be isolated from the solutions by removal of the solvent, for example by evaporation or by precipitation in a suitable precipitating agent, for example acetone or isopropyl alcohol, and further processed to give intermediate products (granules or powder), which can then be employed as raw materials for the production of, for example, shaped articles, films, fibers, membranes or coatings, and generally as cation exchanger material by themselves or in combination with anion exchangers in bipolar systems.

Advantageous properties of the homogeneously mixed polymer alloys according to the invention which are based on sulfonated polyether-ketones and aromatic polysulfones are their improved mechanical properties, for example compared with sulfonated polyether-ketones, and the improved yield stress is particularly advantageous (Table 3). The improved stability of the polymer alloy to acids and bases is furthermore to be emphasized. The hydrophilicity of the alloys is adjusted in a controlled manner by admixing polyvinylpyrrolidone, CoPVPAc or polyethylene glycol diethers or polyethylene glycol diesters (Table 3), without the properties described above being lost. Another important property of the polymer alloys is their higher glass transition temperature compared with the pure sulfonated polyether-ketones. The materials can therefore be employed at higher operating temperatures. This is important in particular for electrochemical uses.

The invention is illustrated in more detail by the following examples.

EXAMPLES

The following polymers were prepared, or employed as commercial products. The sum of the indices x+y is 1 in each case.

Sulfonated polyether-ketone I (PEK-I) having an intrinsic viscosity of 0.7 dl/g, measured in sulfuric acid at 25° C., and recurring units of the following formula

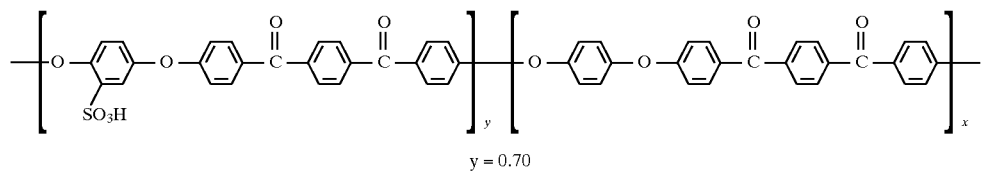

y = 0.70

Sulfonated polyether-ketone II (PEK-II) having an intrinsic viscosity of 0.22 dl/g, measured in sulfuric acid at 25° C., and recurring units of the following formula

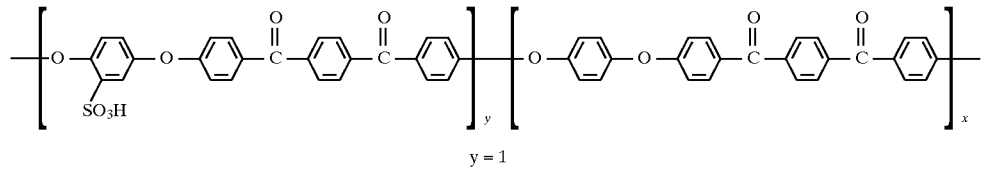

y = 1

Sulfonated polyether-ketone III (PEK-III) having an intrinsic viscosity of 0.5 dl/g, measured in sulfuric acid at 25° C., and recurring units of the following formula

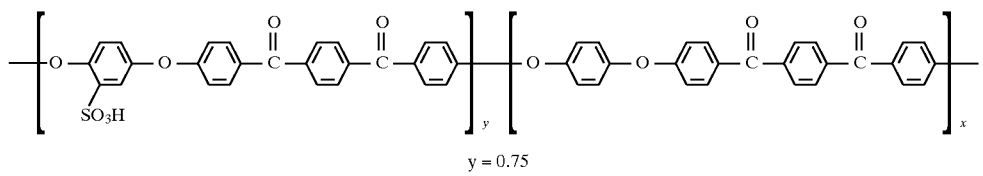

y = 0.75

Sulfonated polyether-ketone IV (PEK-IV) having an intrinsic viscosity of 0.57 dl/g, measured in sulfuric acid at 25° C., and recurring units of the following formula

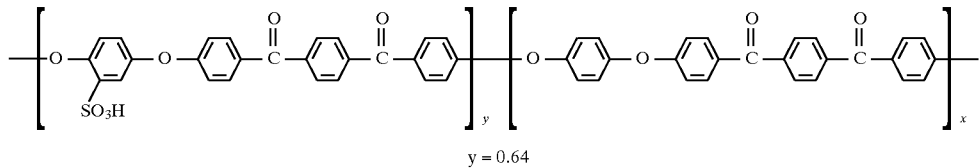

y = 0.64

Sulfonated polyether-ketone V (PEK-V) having an intrinsic viscosity of 0.6 dl/g, measured in sulfuric acid at 25° C., and recurring units of the following formula

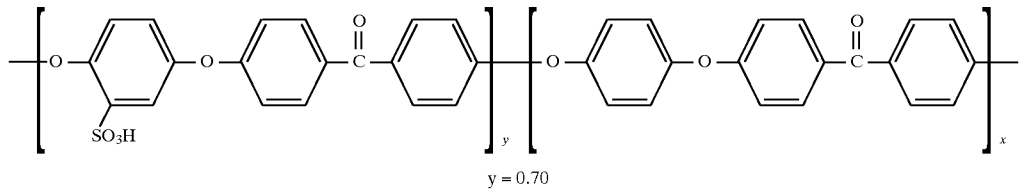

y = 0.70

Sulfonated polyether-ketone VI (PEK-VI) having an intrinsic viscosity of 0.65 dl/g, measured in sulfuric acid at 25° C., and consisting of recurring units of the following formula

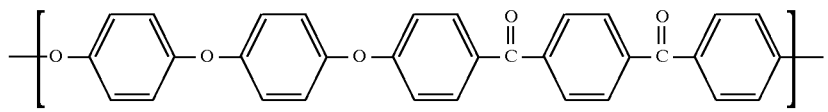

in which 1.38 O-phenylene-O units per recurring unit carry an $SO_3H$ group.

Poly-N-vinylpyrrolidone (PVP, ®Luviskol K30, BASF) and the polymer of N-vinyl-2-pyrrolidone and vinyl acetate (CoPVPAc, ®Kollidon VA 64, BASF) were employed with molecular weights of 40,000, stated as the weight-average.

The polyaryl-sulfones employed were ®ULTRASON E 1000 (BASF,PES I, low-viscosity formulation); ®ULTRASON S 2000 (BASF,PES II, medium-viscosity formulation) and ®RADEL R5000 (Union Carbide, PES III).

Polyglycol dimethyl ethers (PG, HOECHST AG) were employed with molecular weights of 500 and 2000, stated as the weight-average.

EXAMPLES 1 to 20

General instructions for the preparation of the alloys

The compositions of the individual alloys are summarized in Table 1 and 2.

The sulfonated polyether-ketones, the aromatic polysulfones, the polyvinylpyrrolidones and/or the polyglycols were dissolved in N-methylpyrrolidone (10% strength (w/w) solutions) in various weight ratios (cf. Table 1 and 2). These solutions were knife-coated onto glass plates. The solvent was then removed (reduced pressure at 80° C. for 24 hours). After drying, the resulting films were treated with water several times and dried again (reduced pressure at 80° C. for 24 hours). All the films were transparent and ductile, i.e. they could be folded on one another without breaking. Table 3 shows that the yield stress of the sulfonated polyether-ketones can be improved by alloying with aromatic polysulfones. The hydrophilicity (absorption of water) of the alloys can be adjusted in a controlled manner by admixing polyvinylpyrrolidone or polyglycol dimethyl ether (cf. Table 4). Furthermore, the blends show a significantly improved stability to acids or bases compared with the sulfonated polyether-ketones. While the films of sulfonated polyether-ketones already become brittle after a short storage time in 30% strength NaOH or KOH and break in the folding test, the blends of sulfonated polyether-ketones and polysulfone and/or polyvinylpyrrolidone and/or polyglycol dimethyl ether remain mechanically stable after storage in 30% strength NaOH or KOH for several days. The high glass transition temperatures of the blends guarantee use of these ion exchanger materials at temperatures above 140° C. (cf. Table 1 and 2).

Examples 1–15 and 21 and 22 are comparison examples.

Examples 16–20 are according to the invention.

TABLE 1

Alloys of sulfonated polyether-ketones and polysulfones.

| Examples | PEK [%] | PES [%] | $T_g$ a [°C.] | IEC b [mmol/g] |
|---|---|---|---|---|
| 1 | PEK I [100] | PES [0] | 150 | 1.7 |
| 2 | PEK II [100] | PES [0] | 132 | 2.1 |
| 3 | PEK III [100] | PES [0] | 153 | 1.6 |
| 4 | PEK IV [100] | PES [0] | 165 | 1.4 |
| 5 | PEK I [80] | PES I [20] | 184 | 1.3 |
| 6 | PEK I [60] | PES I [40] | 198 | 0.96 |
| 7 | PEK I [40] | PES I [80] | 222 | 0.64 |
| 8 | PEK II [60] | PES I [40] | 185 | 1.26 |
| 9 | PEK III [80] | PES I [20] | 180 | 1.31 |
| 10 | PEK III [60] | PES I [40] | 189 | 0.98 |
| 11 | PEK IV [80] | PES I [20] | 192 | 1.13 |
| 12 | PEK I [80] | PES II [20] | 175 | 1.3 |
| 13 | PEK III [60] | PES II [40] | 156 | 0.98 |
| 14 | PEK I [80] | PES III [20] | 183 | 1.3 |
| 15 | PEK III [60] | PES III [40] | 176 | 0.98 |
| 21 | PEK V [80] | PES II [20] | 148 | 1.36 |
| 22 | PEK V [60] | PES II [40] | 153 | 1.0 |

Legend:
a: $T_g$ = glass transition temperature measured by means of DSC (differential scanning calorimetry) with an apparatus from Perkin, Series DSC 7, with a heating rate of 20° C. Before each measurement, the samples were stored under water at room temperature for 24 hours and then measured. The value thereby obtained serves as the basis for comparison for the range of use temperatures relevant in practice and is below the glass transition point of the dry sample.
b: IEC = ion exchanger capacity determined by titration of the polymer electrolyte solutions in dimethyl sulfoxide with 0.1 normal NaOH, or calculated from the ratio of the percentage contents of sulfur to carbon obtained from elemental analysis.

LEGEND a: $T_g$=glass transition temperature measured by means of DSC (differential scanning calorimetry) with an apparatus from Perkin, Series DSC 7, with a heating rate of 20° C. Before each measurement, the samples were stored under water at room temperature for 24 hours and then measured. The value thereby obtained serves as the basis for comparison for the range of use temperatures relevant in practice and is below the glass transition point of the dry sample.

b: IEC=ion exchanger capacity determined by titration of the polymer electrolyte solutions in dimethyl sulfoxide with 0.1 normal NaOH, or calculated from the ratio of the percentage contents of sulfur to carbon obtained from elemental analysis.

TABLE 2

Alloys of sulfonated polyether-ketones, polysulfones, polyvinylpyrrolidone and polyglycol dimethyl ether

| | Concentrations of the components of the mixture [in % by weight] | | | | | |
|---|---|---|---|---|---|---|
| Examples | PEK [%] | PES [%] | PVP [%] | PG [%] | $T_g$ [°C.] | IEC [mmol/g] |
| 16 | PEK I [80] | PES I [15] | PVP [5] | PG 500 [0] | 178 | 1.3 |
| 17 | PEK I [80] | PES I [10] | PVP [5] | PG 500 [5] | 165 | 1.3 |
| 18 | PEK I [80] | PES I [15] | PVP [0] | PG 500 [5] | 172 | 1.3 |
| 19 | PEK I [60] | PES I [20] | PVP [20] | PG 500 [0] | 153 | 0.96 |
| 20 | PEK I [60] | PES I [20] | PVP [0] | PG 500 [20] | 155 | 0.96 | cf. Legend after Table 1.

TABLE 3

Mechanical data of the films from the polymer alloys according to the examples

| Examples | E modulus [GPa] | Elongation at break [%] | Yield stress [MPa] |
|---|---|---|---|
| 1 | 2.3 | 124 | 17 |
| 5 | 2.3 | 113 | 30 |
| 6 | 2.8 | 108 | 44 |
| 7 | 3.0 | 95 | 56 |
| 9 | 2.7 | 120 | 36 |
| 12 | 2.4 | 115 | 28 |
| 13 | 2.4 | 103 | 26 |
| 14 | 2.6 | 117 | 40 |
| 15 | 3.1 | 109 | 38 |
| 16 | 2.1 | 132 | 19 |
| 17 | 2.0 | 145 | 15 |
| 18 | 2.1 | 140 | 17 |
| 19 | 2.4 | 135 | 12 |
| 20 | 2.2 | 128 | 14 |
| 21 | 2.3 | 108 | 24 |
| 22 | 2.6 | 98 | 27 |

To determine the mechanical properties of the materials prepared, the samples were stored in water at room temperature for 24 hours and, after dabbing dry on the surface, were then measured under the following conditions:
Test apparatus: ®Instron 4302 (Instron, Offenbach, Germany)
Test specimen: Film cast from solution
Specimen geometry: Length: 50 mm; Width: 10 mm; Thickness: 0.25 mm
Test specification: 1 kN load cell
Clamped length: 35 mm
Measurement of the E modulus (modulus of elasticity) with a dynamic displacement transducer
Measurement length: 10 mm
Measurement speed: 1 mm/min to 0.35 mm elongation
Measurement over the traverse path
Measurement length: 35 mm
Measurement speed: 1 mm/min to 0.35 mm, then changed to 50 mm/min to fracture

TABLE 4

Water absorption test according to ASTM D 4019-81

| | [1]Water content % by weight | | | Number of | Standard |
|---|---|---|---|---|---|
| Example | min. | max. | [2]M | measurements | deviation |
| 1 | 11.5 | 12.1 | 11.8 | 4 | ±0.25 |
| 5 | 7.14 | 7.87 | 7.5 | 4 | ±0.24 |
| 6 | 4.52 | 4.90 | 4.72 | 4 | ±0.16 |

TABLE 4-continued

Water absorption test according to ASTM D 4019-81

| | [1]Water content % by weight | | | Number of measurements | Standard deviation |
|---|---|---|---|---|---|
| Example | min. | max. | [2]M | | |
| 7 | 3.27 | 3.62 | 3.44 | 3 | ±0.29 |
| 13 | 4.23 | 4.65 | 4.44 | 4 | ±0.20 |
| 14 | 6.64 | 7.10 | 6.88 | 4 | ±0.25 |
| 15 | 5.3 | 6.2 | 5.75 | 4 | ±0.10 |
| 16 | 13.2 | 13.9 | 13.5 | 3 | ±0.19 |
| 17 | 17.4 | 18.1 | 17.5 | 2 | ±0.24 |
| 18 | 15.3 | 15.9 | 15.6 | 3 | ±0.34 |
| 19 | 25.3 | 25.9 | 25.6 | 3 | ±0.40 |

[1]Based on the dry weight
[2]M = mean

To determine the absorption capacity of the materials prepared for water in accordance with ASTM D 4019-81, the samples were stored at 23° C. at a relative atmospheric humidity of 85% for at least 210 days. The amounts of water (water content % by weight) released by the samples at an elevated temperature according to the stated standard were then determined coulometrically.

We claim:

1. A homogenous polymer alloy which alloy is proton conductive, comprising:

at least one sulfonated aromatic polyether-ketone of the formula I,

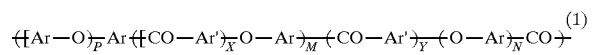

in which

Ar is a phenylene ring with para and/or meta bonds,

Ar'- is phenylene, naphthylene, biphenylene or anthrylene or another divalent aromatic unit, X, M and N independently of one another are zero or 1

Y is zero, 1, 2 or 3 and

P is 1, 2, 3, or 4, and in which, in the formula I, at least 20 and at most 100% of the O—Ar—O units are substituted by an $SO_3H$ group, at least one polysulfone, and at least one hydrophilic polymer selected from the group consisting of polyvinylpyrrolidone, polyglycol dialkyl ethers, polyglycol dialkyl esters and

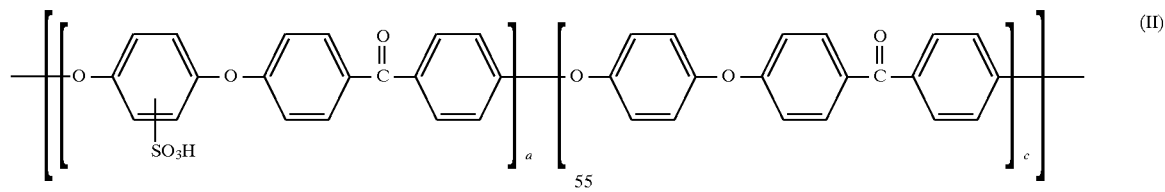

poly-[1-(2-oxo-1-pyrrolidinyl)ethylene-co-1-(acetoxy)ethylene], wherein the polysulfone is an aromatic polysulfone which has structural units of the formula V $$—X—Ar^1—(—Z—Ar^2—)_n(X—Ar^3)_mSO_2—Ar^1—\quad(V)$$

in which

—$Ar^1$—is a 1,4-phenylene radical or a divalent radical of a heteroaromatic or of a ($C_{10}$–$C_{14}$) -aromatic, which optionally contains sulfonic acid groups or ether bridges and is optionally substituted by one or two branched or unbranched $C_1$–$C_4$-alkyl or alkoxy radicals or by one or more halogen atoms, —$Ar_2$—and $Ar^3$ are identical or different and are 1,2-phenylene, 1,3-phenylene, 1,4-phenylene or 4,4'-biphenyl radicals, which are optionally substituted by one or two branched or unbranched $C_1$–$C_4$-alkyl or alkoxy radicals or by one or more halogen atoms, —Z— is a direct bond or one of the following divalent radicals —O—, —S—, —C($CH_3$)$_2$—, —C($CF_3$)$_2$—, —$SO_2$— or —X—$Ar^3$—X—, X is O, S, SO, CO or $SO_2$, and n is an integer, and m is an integer, wherein the weight ratio of sulfonated polyether-ketone/polysulfone is 1:99 to 99:1 and, the alloy comprises 50 to 30% by weight of the hydrophilic polymer.

2. A homogeneous polymer alloy as claimed in claim 1, which comprises at least one sulfonated aromatic polyether-ketone of the formula I

in which

Ar is a phenylene ring with para and/or meta bonds,

Ar'- is phenylene, naphthylene, biphenylene or anthrylene or another divalent aromatic unit, X, M and N independently of one another are zero or 1, Y is zero, 1, 2 or 3 and P is 1, 2, 3 or 4, and in which, in the formula I, at least 20 and at most 100% of the O—Ar—O units are substituted by an $SO_3H$ group, and wherein the indices p, X and M in the formula I are coordinated with one another such that p=2–(1–X)×M.

3. A polymer alloy as claimed in claim 1 or 2, which comprises at least one sulfonated aromatic polyether-ketone of the formula II

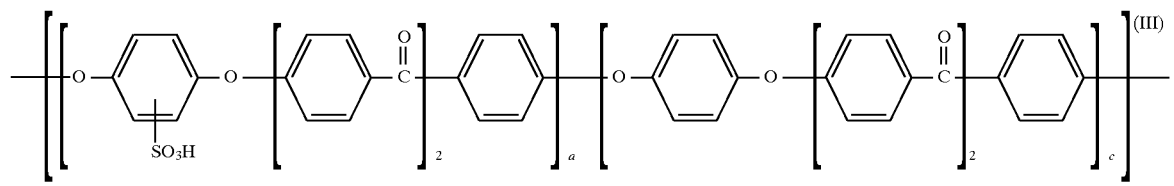

in which a is a number from 0.1 to 1, c is a number from 0 to 0.8 and the sum a+c=1, or of the formula III

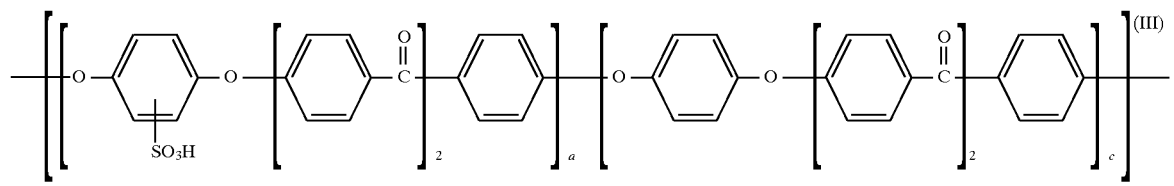

in which a is a number from 0.2 to 1, c is a number from 0 to 0.8 and the sum a+c=1, or of formula IV

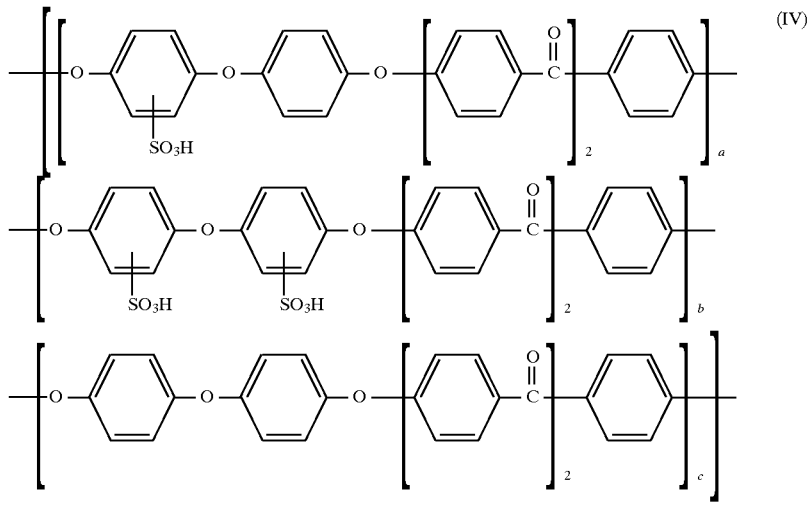

in which a is a number from 0.1 to 1, b is a number from 0 to 1, c is a number from 0 to 0.5 and the sum a+b+c=1.

4. A polymer alloy as claimed in claim 3, wherein the sulfonated aromatic polyether-ketone is a sulfonated copolymer which comprises at least two different recurring units of the formula II, III or IV.

5. A polymer alloy as claimed in claim 1, wherein the sulfonated aromatic polyether-ketone has a molecular weight of which the weight-average is in the range from 10,000 to 150,000 g/mol.

6. A polymer alloy as claimed in claim 1, which comprises at least one aromatic polysulfone which has structural units of the formula V

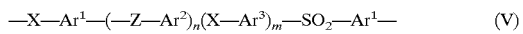

in which
—$Ar^1$—is a 1,4-phenylene radical or a divalent radical of a heteroaromatic or of a ($C_{10}$–$C_{14}$) -aromatic, which optionally contains sulfonic acid groups or ether bridges and is optionally substituted by one or two branched or unbranched $C_1$–$C_4$-alkyl or alkoxy radicals or by one or more halogen atoms,
—$Ar_2$—and $Ar^3$ are identical or different 1,2-phenylene, 1,3-phenylene, 1,4-phenylene or 4,4'-biphenyl radicals, which are optionally substituted by one or two branched or unbranched $C_1$–$C_4$-alkyl or alkoxy radicals or by one or more halogen atoms,
—Z—is a direct bond or one of the following divalent radicals —O—, —S—, —C(CH$_3$)$_2$—, —C(CF$_3$)$_2$—, —SO$_2$—or —X—$Ar^3$—X—,
x is O, S, SO, CO or SO$_2$ and
n is an integer, of 0, 1 or 2 and
m is an integer.

7. A polymer alloy as claimed in claim 1, which comprises at least one aromatic polysulfone of the formula A, B, C or D
(A) —O—Ar—SO$_2$—Ar—
(B) —O—Ar—O—Ar—SO$_2$—Ar—
(C) —O—Ar—C(CH$_3$)$_2$—Ar—O—Ar—SO$_2$—Ar—,
(D) —O—Ar—Ar—O—Ar—SO$_2$—Ar— in which the individual groups Ar independently of one another are a phenylene radical or a divalent radical of a heteroaromatic or of a $C_{10}$–$C_{14}$ aromatic, which optionally contains sulfonic acid groups or ether bridges and is optionally substituted by one or two $C_1$–$C_4$-alkyl or $C_1$–$C_4$-alkoxy radicals or one or more halogen atoms.

8. A polymer alloy as claimed in claim 1, which comprises a polyvinylpyrrolidone, the molecular weight of which, stated as the weight-average, is in the range from 1000 to 3 million.

9. A polymer alloy as claimed in claim 1, which comprises a polyglycol dialkyl ether or polyglycol dialkyl ester having a molecular weight of which the weight-average is in the range from 100 to 100,000.

10. A process for the preparation of a homogeneous polymer alloy as claimed in claim 1, which comprises preparing a solution which contains the sulfonated aromatic polyether-ketone, the aromatic polysulfone and the remaining polymer constituents in an aprotic organic solvent and then removing the solvent.

11. The process as claimed in claim 10, wherein the aromatic polysulfone is prepared by polycondensation in an aprotic organic solvent and the solution of the polysulfone is combined with a solution which contains the sulfonated aromatic polyether-ketone and optionally other polymer constituents in the same solvent, and the solvent is then removed.

12. The polymer alloy as claimed in claim 1, useful for the production of shaped articles, films, symmetric and asymmetric membranes, coatings or fibers or cation exchanger membranes.

13. A polymer alloy as claimed in claim 6, wherein n is 1 or 2.

14. A polymer alloy as claimed in claim 6, wherein m is 0, 1 or 2.

15. A polymer alloy as claimed in claim 8, which comprises a polyvinylpyrrolidone, the molecular weight of which, stated as the weight-average, is in the range from 20,000 to 200,000.

16. A polymer alloy as claimed in claim 8, which comprises a polyvinylpyrrolidone, the molecular weight of which, stated as the weight-average, is in the range from 40,000 to 100,000.

17. A polymer alloy as claimed in claim 9, which comprises a polyglycol dialkyl ether or polyglycol dialkyl ester having a molecular weight of which the weight-average is in the range from 250 to 80,000.

18. A polymer alloy as claimed in claim 9, which comprises a polyglycol dialkyl ether or polyglycol dialkyl ester having a molecular weight of which the weight-average is in the range from 500 to 50,000.

* * * * *